United States Patent
Picard et al.

(10) Patent No.: US 6,345,132 B1
(45) Date of Patent: Feb. 5, 2002

(54) OPTICAL SWITCHING ELEMENT AND SWITCHING ARRANGEMENT

(75) Inventors: Antoni Picard, Eltville; Martin Schmidt, Berlin; Klaus-Peter Kamper, Aachen; Jane Schulze, Mainz; Michel Neumeier, Mandelbachtal, all of (DE)

(73) Assignees: Institut fur Mikrotechnik Mainz GmbH, Mainz; Controlware GmbH Kommunikationssysteme, Dietzenback, both of (DE)

( * ) Notice: Subject to any disclaimer, the term of this patent is extended or adjusted under 35 U.S.C. 154(b) by 0 days.

(21) Appl. No.: 09/381,409
(22) PCT Filed: Mar. 19, 1998
(86) PCT No.: PCT/EP98/01600
§ 371 Date: Sep. 17, 1999
§ 102(e) Date: Sep. 17, 1999
(87) PCT Pub. No.: WO98/43124
PCT Pub. Date: Oct. 1, 1998

(30) Foreign Application Priority Data

Mar. 20, 1997 (DE) .......................................... 197 11 564

(51) Int. Cl.[7] ................................ G02B 6/26; G02B 6/02
(52) U.S. Cl. .............................. 385/18; 385/25; 385/16; 385/19; 385/125
(58) Field of Search .............................. 385/16, 18, 19, 385/25, 125

(56) References Cited

U.S. PATENT DOCUMENTS

| | | |
|---|---|---|
| 4,582,391 A | 4/1986 | Legrand |
| 4,714,326 A | 12/1987 | Usui et al. |
| 5,434,756 A | 7/1995 | Hsu et al. |

FOREIGN PATENT DOCUMENTS

| | | |
|---|---|---|
| GB | 1 494 150 | 12/1997 |

OTHER PUBLICATIONS

IEEE Transactions on Components, Packaging, and Manufacturing Technology—Part B, vol, 1B, No. 2, May 1995, pp. 241–244.

Makihara M et al: "Self–Holding Optical Waveguide Switch Controlled By Micromechanisms". Proceedings of the Electronic Components and Technology Conference, Las Vegas, May 21–24, 1995, no. Conf. 45, May 21, 1995, Institute of Electrical and Electronics Engineers, pp. 418–422, XP000624977, see p. 418, right hand column—p. 419, left–hand column.

Primary Examiner—Georgia Epps
Assistant Examiner—Michael A. Lucas
(74) Attorney, Agent, or Firm—Hudak & Shunk Co., L.P.A.

(57) ABSTRACT

The invention relates to an optical switching element for altering the propagation direction of at least one light beam, comprising a transparent base body (21), said base body being provided with a recess (20) for forming at least one boundary surface (19) between an optically denser medium and an optically more translucent medium. The incident light strikes this boundary surface (19). The recess (20) is filled partly with a liquid (26) and contains a moveable body (16). The liquid (26) and the moveable body (16) have approximately the same refractive index as the transparent base body. To switch the switching element (15) to a transmitting switching state, the moveable body is positioned in the recess in such a way that the gap between the boundary surface and the surface of the moveable body is filled completely with the liquid. If the moveable body is positioned in the recess in such a way that the boundary surface is free of the liquid, the incident light is reflected on said boundary surface. The switching element has low optical damping and is therefore economical to produce. Its compact construction means that larger switching arrangements with a large number of optical inputs and outputs can be created with the switching element.

38 Claims, 15 Drawing Sheets

OPTICAL SWITCHING ELEMENT AND SWITCHING ARRANGEMENT

BACKGROUND OF THE INVENTION

The invention concerns an optical switching element according to the preamble of claim 1. Furthermore, the invention concerns a switching arrangement according to the preamble of claim 30. Such a switching arrangement is known from the IEEE Transactions on Components, Packaging, and Manufacturing Technology—Part B, Vol. 1B, No. 2, May 1995, pp. 241–244.

Matrix switches are familiar for connecting of fiber-optics lines by which N optical input channels can be switched to M optical output channels in any desired way. The number of the optical fibers being switched depends on the particular application. In the realm of telecommunications, matrix switches with a plurality of input and output channels find use.

There are known mechanical matrix switches in which mirrors or prisms are moved with high precision. Switches based on mirror or prism arrangements require a very stable and precise construction. The required precision generally entails high technical expense.

Besides the optical switching elements the microoptical components of which are moved with high precision, there are also known optical switching elements which work by a switching principle that does not require a movement of microoptical.

GB 1 494 150 describes an optical switching element in an optical waveguide wherein one boundary surface on which the incident light impinges is switched between a condition of total reflection and transmission. The known optical switch has a narrow slit in the core of the optical waveguide. The slit forms a regular boundary surface between an optically more dense medium, i.e., the material of the core of the optical waveguide, and an optically less dense medium, i.e., a gaseous substance in the slit, so that light impinging on the boundary surface at a slant and conducted along the optical waveguide is totally reflected at the boundary surface in the direction of an adjoining optical waveguide. In order to switch to the transmitting condition, in which the light impinging on the boundary surface maintains its direction of propagation, a fluid is introduced into the slit, the index of refraction of which corresponds to the index of refraction of the material from which the core of the optical waveguide is made. The device provided for optional introducing of the substance into its fluid or gaseous phase is a storage vessel with a heating device arranged on the optical waveguide. By thermal expansion, the fluid is forced into the slit protruding through the cladding layer into the core layer of the optical waveguide. In another configuration, the fluid substance located in the slit is brought into the gas phase by heating.

The costly production of the familiar switch is a disadvantage, since it is first necessary to make a slit in an optical waveguide, affix a device for filling to it, and seal off this construction against the outside. Because of slitting the optical waveguide, it is only possible to realize parallel surfaces, and moreover these reflecting surfaces do not have high optical quality. Furthermore, the known switch has a high optical damping, since the light beam emerging from the optical waveguide in the region of the slit is divergent and not guided. Therefore, in the transmitting condition of the switch, a portion can be coupled over to the adjoining optical waveguide, which leads to considerable cross-talk in the familiar switch.

SUMMARY OF THE INVENTION

The basic purpose of the invention is to create an optical switching element with low optical damping and low cross-talk, which has a compact construction and a long lifetime, yet which is economical to produce. Furthermore, the purpose of the invention is to provide a switching arrangement with N optical inputs and M optical outputs with the aforementioned properties.

The purposes of the invention are achieved by the features indicated in Patent claim 1 and 30.

The optical switching element is characterized in that the recess contains a fluid and a body which can move in the recess, the fluid being of such nature and the movable body being of such configuration and able to move in the recess between a position in which the optical switching element is in the transmitting condition and a position in which the optical switching element is in a reflecting condition, that, in the transmitting condition of the switch, the region of the slit between the boundary surface and the surface of the movable body lying in the path of the incident light is filled completely with the fluid and, in the reflecting condition of the switch, at least the region of the boundary surface lying in the path of the incident light is free of the fluid, so that the incident light is essentially reflected at the boundary surface and at least one activating device is provided for switching the moveable body between the transmitting and the reflecting condition of the switch.

In the optical switching element according to the invention, the recess in the transparent base body is only partly filled with the fluid, which is extensively adapted to the index of refraction of the base body. For the switching between the transmitting and reflecting condition, a body which can move in the recess is provided. The movable body is configured such, and it can move in the recess between two positions, that in the transmitting condition of the switch at least the region of the slit lying in the path of the incident light between the boundary surface and the surface of the movable body is completely filled with the fluid. This ensures that the incident light is not totally reflected at the boundary surface, but rather passes through the boundary surface. In the reflecting condition, the body is situated in a position in which the boundary surface is free of fluid, so that the incident light is totally reflected at the boundary surface between the optically more dense medium, i.e., the material of the base body, and the optically less dense medium, i.e., a gas located in the cavity.

The decisive advantage of the switching element is that the boundary surface responsible for the switching process is not moved. Thanks to the preferential use of collimated light beams, no complicated waveguide structures are necessary for guiding the beam in the base body. Since the beam is not divergent, even in the recesses involved in the switching process, the optical multiple switch according to the invention has low optical damping and low cross-talk.

The use of the terms optical input and optical output in contrast with the term optical channel serves only to simplify the description of the optical switching element and its switching arrangements. Because the light paths are reversible, a use in both beam directions, i.e., bidirectional, is possible.

Preferably, the optical switching element according to the invention is operated with free beams, i.e., with light beams not traveling in waveguide structures. This can be achieved, for example, by collimating the light furnished by means of optical waveguides before it enters the switch proper. Basically, however, it is also conceivable to have optical structures for light guidance integrated in the optical switching element, e.g., by means of layer or groove waveguide structures, although this requires a more complex construction of the base body.

When the switching element is switched to the reflecting condition, the fluid must be completely retracted from the boundary surface in the shortest possible time. This effect can be supported in that the surfaces of the boundary involved in the switching condition are subjected to an additional treatment, such as chemical or plasma-chemical, or they are coated with one or more suitable materials. In this regard, a fine structuring of the relevant surfaces is also of advantage.

The base body and the body which can move in the recess consist at least in parts of materials which are transparent in the wavelength region used. If both bodies consist of the same material, this has the advantage that the bodies will have the same index of refraction. The fluid should likewise have a similar index of refraction.

The base body and the movable body can consist of transparent materials, like (fluorinated) polymers with low optical absorption in the desired spectral region, glasses, materials produced by sol-gel processes, silver halides. Conventional PMMA can be used for signal transmission in the visible region. In the infrared spectrum, modified polymers are advantageous.

Hybrid systems of different substances can also be used as the fluid. An adaptation of the index of refraction, e.g., for PMMA in the visual region, can be achieved by a mixture of decaline and tetraline.

A gas or a gas mixture can be used as the optically less dense medium. Suitable for this is an inert gas like argon. Advantageously, the gas has poor diffusion properties. But air is also suitable as the optically less dense medium.

It is of special advantage that the activating device for switching the movable body between the transmitting and the reflecting condition can be arranged outside the beam path. Since the actual switching process occurs through the fluid, an exact guidance of the movable body is not necessary, so that the activating device can be realized cheaply without major technical expense.

In theory, a direct mechanical coupling between the, e.g., piezoelectrical or thermoelectrical activating device and the movable body is possible. Preferably, however, the activating of the movable body is without contact, so that the recess can be hermetically encapsulated, which makes the switching element largely insensitive to external influences.

In a preferred embodiment, the activating device has an electromagnet arranged outside the recess, and the movable body is magnetic. Preferably, the movable body consisting of the same (nonmagnetic) material as the base body is provided with a layer on its surface or a body of a magnetic or a magnetizable material. Stable switching conditions independent of the power supply can be achieved with permanent magnets. In place of an electromagnetic activating device, an electrostatic activating device can also be provided. In a further embodiment, two activating devices arranged on opposite sides outside the recess are provided.

The fluid can be distributed in the recess by displacing the fluid with the movable body and forcing it into the slit. For this, the recess is filled so much with the fluid that, in the reflecting condition, the region of the boundary lying in the beam path of the incident light is outside the level of the fluid. In the transmitting condition, the movable body is moved into the fluid such that the region of the slit lying in the beam path of the incident light is filled with fluid by displacement. The fluid can be bound to the bottom of the recess, for example, with a spongelike material, so that the switching element functions independent of position.

In an alternative embodiment, a fluid film is formed between the movable body and the wall of the recess by means of capillary forces and it is carried along with the body during the switching process. Thus, in the transmitting condition, at least the region of the slit between the boundary surface and the surface of the movable body that lies in the beam path of the incident light is filled with the fluid film. In the reflecting condition, on the other hand, the region of the boundary surface lying in the beam path of the incident light is free of the fluid film. The two principles of displacement and of fluid film can also be combined.

The recess can essentially have any desired configuration. What is important is that the boundary surface be oriented to the direction of propagation of the incident light. The angle between the direction of propagation of the incident light and the boundary surface is not necessarily in the region of 40° to 50°. Thus, it is conceivable to have the angle of incidence such that total reflection does not occur. With such an arrangement, the switching element could also be used as a beam splitter. However, it is preferably dimensioned such that a total reflection occurs.

In order that the air inside the recess not hinder the switching mechanism, for example, it is possible to provide venting slits at the margin of the recess. Through these channels, the optically less dense medium can then flow unhindered during the switching process. In another configuration, the movable body can have a corresponding suitable shape.

At least one lateral surface of the recess forms a light exit surface for the transmitted light. It is not necessary for the lateral surfaces not involved in the reflection to have the same surface quality as the lateral surfaces which form the boundary surface, inasmuch as these lateral surfaces not involved in the reflection are wetted with the fluid in the transmitting condition.

In one embodiment, the recess has a triangular cross section in the plane of the path of a light beam. In another embodiment, the recess has a rectangular cross section. Advantageously, the movable body essentially has the same cross section geometry as the recess. But it is also conceivable that at least one of the surfaces of the recess that reflects incident light beams as a boundary surface in the reflecting condition be shaped and arranged such that it focuses at least a portion of the light beams impinging on this surface during the reflecting.

The base body can advantageously have other recesses, which serve to accommodate and hold optical waveguides, for example, glass or plastic fibers or bands of fibers and fiber connectors. For example, these can be channel-like structures, each of which is open at one outer side of the base body, so that optical waveguides can be easily inserted into the base body in a defined position. Additional clamplike or springlike structures can be provided for fixation of the optical waveguides.

Furthermore, one or more recesses to accommodate optical elements can be provided in the base body. These are generally required to guide the light, because of the relatively high divergence of the light beams emerging from the input optical waveguides. Optical elements for collimating and/or focusing the light can be integrated in the base body, for example, spherical lenses, micro lenses, GRIN lenses, cylindrical lenses, etc. It is also conceivable to have, for example, cell-like micro lens fields to focus the light beams of several optical channels. Yet it is also possible to efficiently guide the light inside the base body with integrated optical waveguides, e.g., groove waveguides or film waveguides.

Yet it is also possible to arrange one or more additional recesses in the beam path that are shaped such as to focus incident light. Besides the shape of the recess, it is also the index of refraction of the substance or mixture of substances contained in the recess that is critical.

According to the invention, a light beam impinging on a boundary surface that is formed by a surface of the recess is reflected in the reflecting condition. The reflected beam impinges on one exit, whereas in the transmitting condition the beam passes through the recess and impinges on a different exit. Yet it is also conceivable to have several incident light beams impinging on the same boundary surface formed by a surface of the recess. Accordingly, several exits are to be provided for this.

In another embodiment of the invention, at least two incident light beams impinge on two boundary surfaces, which correspond to two surfaces of the recess. Advantageously, the light beams impinging on the two boundary surfaces lie at an angle of 70 to 110° to each other. Preferably, in the transmitting condition, the light beam passing through the one boundary surface impinges on the same exit as the other light beam in the reflecting condition when it is reflected by the other boundary surface. The two lateral surfaces of the recess forming the boundary surfaces are roughly parallel to each other in one embodiment version. In a second embodiment version, these two surfaces of the recess make an angle of 70 to 110°, preferably around 90°. However, other geometries are also conceivable.

Preferably, in this second version, one cross section of the recess and of the movable body corresponds to an equilateral triangle in the plane of the path of a light beam. Such an arrangement in the case of two incident light beams preferably has three exits, and one exit corresponds to both a transmitted and also to another reflected light beam.

If this arrangement should only have two exits, then two additional reflecting surfaces need to be provided, at which the one transmitted light beam is reflected, preferably totally reflected, so that it impinges on the exit where another reflected light beam impinges in the reflecting condition. These two additional surfaces preferably form an angle of 70 to 110° with each other. In a first embodiment, these two surfaces are formed by two outer surfaces of the base body. In a second embodiment, these two surfaces are formed by at least one additional recess, preferably filled with an optically less dense substance or mixture of substances. In a third embodiment, these two surfaces correspond to two surfaces of the movable body that are not wetted with fluid in the transmitting condition of the switch. In this case, the movable body has a preferably square cross section in the plane of the path of a light beam. Whereas in the other embodiments it is only necessary to have an exact position of the boundary surface formed by one or more lateral surfaces of the recess and the guiding of the movable body does not require high precision, it is necessary in this sample embodiment to establish the position of the movable body as precisely as possible in the transmitting condition of the switch.

In another embodiment of the invention, there are more than two optionally transmitting or reflecting boundary surfaces that are formed by correspondingly many surfaces of the recess. The recess and the movable body have, for example, a square cross section, which enables four boundary surfaces. Preferably, one reflected beam and one transmitted beam each impinge on the same exit in different conditions of the switch.

In the embodiments described thus far, more than one light beam can also be optionally reflected or transmitted at the boundary surface or the boundary surfaces. Basically, two arrangements or combinations of these two arrangements are conceivable here. According to the first arrangement, the incident light beams lie essentially in the same plane as their components which are reflected in the reflecting condition of the switch. According to the second arrangement, the plane of the incident light beams lies preferably at an angle of 70° to 110° to the plane of their reflected components.

In order to avoid the need to move the movable body across the entire range of the boundary surface lying in the beam path when there are several light beams impinging on one boundary surface, it may be advantageous for the movable body to have two regions of different cross section parallel to the plane of the beam path of one light beam. The regions of larger cross section advantageously lie so close to at least one surface of the recess that a fluid film can be maintained between these regions and the corresponding surface of the recess. The regions of smaller cross section lying between the regions of larger cross section preferably have such a distance from the corresponding surface of the recess that no fluid film can form in between. In order to get from the transmitting to the reflecting condition of the switch, the movable body only needs to be shifted enough that, instead of the regions with larger cross section, the nearest regions of smaller cross section of the movable body border on the regions of the boundary surface lying in the beam path.

The switch arrangement is characterized in that the recess contains the fluid and a movable body, the fluid being of such nature and the movable body of such configuration, and being so movable in the recess between one position in which the optical switching element is in the transmitting condition and another position in which the optical switching element is in the reflecting condition, that at least the region of a slit between the boundary surface and the surface of the movable body lying in the beam path of the incident light is completely filled with the fluid in the transmitting condition of the switch, and in the reflecting condition at least the portion of the boundary surface lying in the beam path of the incident light is free of the fluid, so that the incident light is essentially reflected at the boundary surface, and the at least one activating device serves to switch the switching element between the transmitting and the reflecting condition by moving the movable body.

All of the embodiments described above can be used as the switching element. The number of inputs and outputs can be the same or different (N=M or N≠M).

In an expanded embodiment, besides the N optical inputs and M optical outputs there are additional N optical outputs, which are arranged on the side of the switch arrangement opposite the first N optical inputs. Furthermore, the possibility also exists to provide additional M optical inputs, which are arranged on the side of the switch arrangement opposite the first M optical outputs. Furthermore, the possibility also exists to provide 2×N optical inputs and 2×M optical outputs with N×M optical switching elements in matrix arrangement.

If one particular input of the N input channels is to be switched to only the corresponding output of either the first N output channels or the second N output channels, a switch arrangement can also be feasible in which the N switching elements are arranged in the manner of a diagonal of a N×N matrix.

The light can be guided into and out of the switch arrangement by means of optical waveguides. To couple the optical waveguides of the switching elements, there are N parallel channels, for example in the common base body, to accommodate the N input waveguides and M parallel channels to accommodate the M output waveguides, while the input channels for purposes of a simple geometrical construction are arranged at an angle of 70 to 110° to the output channels and the boundary surfaces of the recesses of the individual switching elements are at an angle of 40 to 50° to the input and output channels. The base body advantageously consists of a bottom plate, a structurized plate, and a top plate. For collimation/focusing of the light, it can be advantageous to integrate optical elements, especially micro lenses or GRIN lenses. For this, corresponding depressions are provided in the beam path between the input and output channels and the recesses of the switching elements.

In another embodiment, the individual switching elements are realized as self-standing switching modules, which can be used in a matrix plate with corresponding recesses arranged, for example, in the manner of a matrix. The matrix plate is advantageously provided with additional recesses suitable for accommodation of optical waveguides and/or optical components. With this modular construction, it is possible to advantageously provide and reconfigure flexible switching arrangements made from identical or different switch modules.

At least parts of the base body, the movable body, the activating device and/or the matrix plate can advantageously be produced with microtechnology methods, for example, by means of the LIGA process, in large numbers at favorable cost.

The optical switching elements described here and their switch arrangements can be used with particular advantage in the field of optical communications, especially for the arbitrary connecting or decoupling of optical communication channels and for the coupling of optical components into existing optical connections. Thanks to the possibility of arranging the reflected light beams perpendicular to the transmitted ones, compact optical bus systems can be realized with the switching elements and their switch arrangements according to the invention, similar to the bus systems familiar in microelectronics with plug-in cards and plates arranged at right angles.

Hereafter, several sample embodiments of the invention shall be explained more closely with reference to the drawings.

BRIEF DESCRIPTION OF THE DRAWINGS

FIG. 3a is the switching element of FIG. 1 in the transmitting condition;

FIG. 3b is the switching element of FIG. 1 in the transmitting condition, wherein the movable body occupies a position different from that in FIG. 3a;

FIG. 4a is a cross section through the switching element of FIG. 3a along line FIG. 4a-FIG. 4a;

FIG. 4b is a cross section through the switching element of FIG. 3b along line FIG. 4b-FIG. 4b;

FIG. 6a is a cross section through a switching element based on the fluid film principle in the reflecting condition per FIG. 5a along line FIG. 6a-FIG. 6a;

FIG. 6b is a cross section through a switching element based on the fluid film principle in the transmitting condition per FIG. 5b along line FIG. 6b-FIG. 6b;

FIG. 7 is a cross section through a switching element based on the displacement principle in the reflecting condition per FIG. 5a along line FIG. 6a-FIG. 6a;

FIG. 8 is a cross section through a switching element based on the displacement principle in the reflecting condition per FIG. 5b along line FIG. 6b-FIG. 6b;

DETAILED DESCRIPTION OF THE INVENTION

Figure 1:
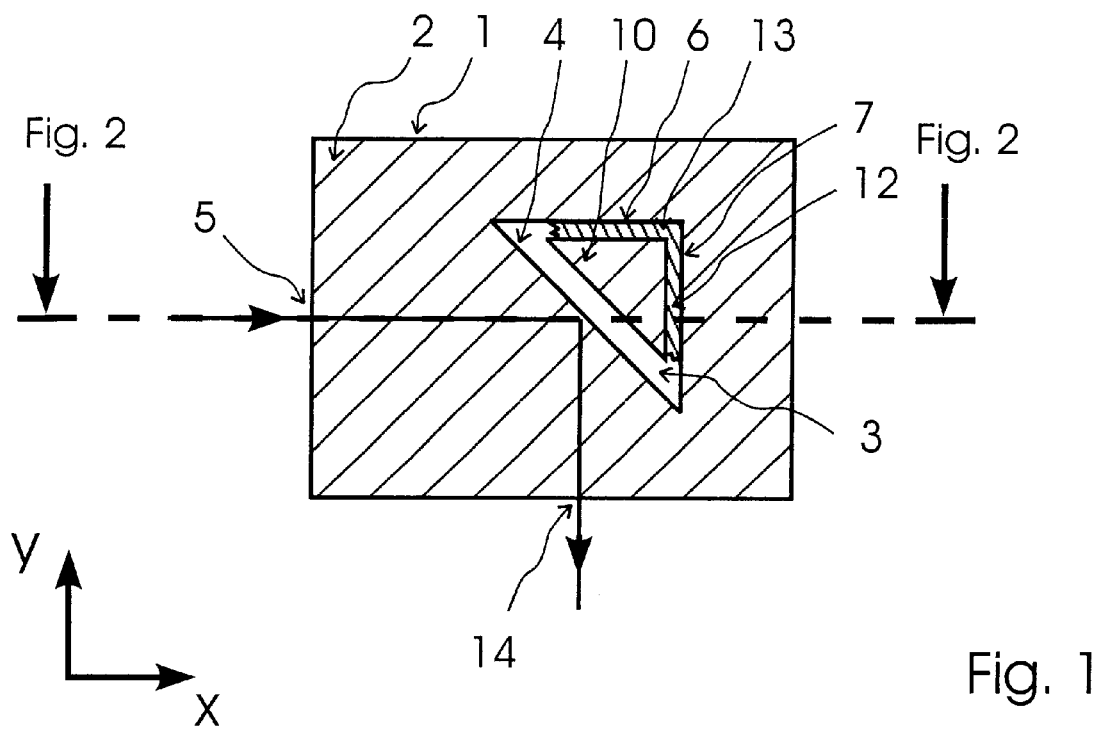
FIG. 1 is one embodiment of the switching element based on the principle of the fluid film in schematic representation, wherein the switching element takes on the switch condition of reflection.

FIGS. 1 through 4 show, in schematic representation, the switching conditions of a switch element 1, which is based on the fluid film principle. The switching element has a base body 2 of transparent material with a recess 3. The recess 3 comprises a boundary surface 4, on which the incident light 5 impinges at an angle of around 45°. The rear lateral surfaces 6, 7 of the recess 3 subtend, with the boundary surface 4, an angle of 45°. At the lower and upper side, the recess 3 is bounded by plane surfaces 8, 9, which subtend an angle of 90° with lateral surfaces 6, 7.

In the recess 3, there is a body 10 with the cross section of an equilateral triangle. The triangular-shaped body can move in the recess 3 by means of an activating device, not represented in FIGS. 1–3, in the XY-plane to form a narrow slit 12 between its lateral surfaces and the lateral surfaces 6, 7 or the boundary surface 4 of the recess 3, as well as between its upper and lower side and the upper and lower surfaces 8, 9 of the recess. Furthermore, the recess 3 contains a fluid 13 with an index of refraction that is roughly equal to the index of refraction of the material from which the base body and the movable body are made. The amount of fluid is measured such that a fluid film is formed in the narrow slit 12 by forces of adhesion, but the other region in the recess 3 is essentially not filled with the fluid.

Figure 2:
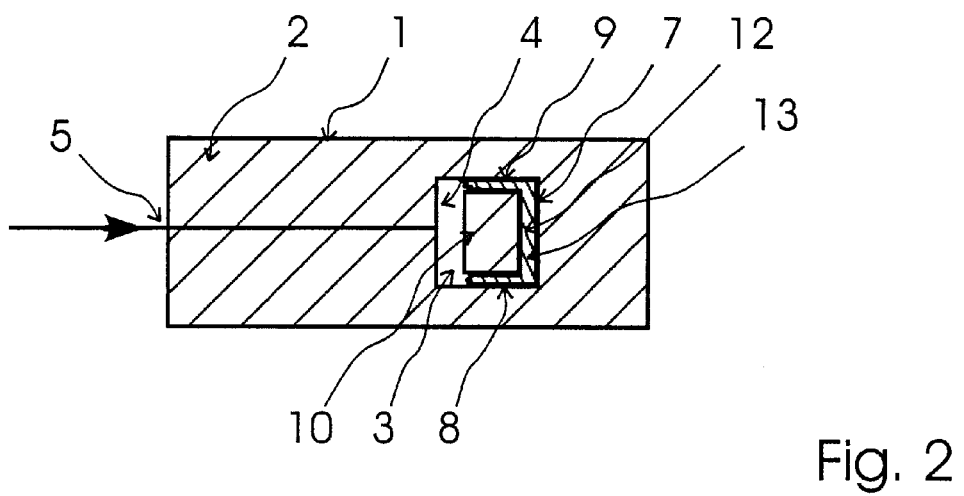
FIG. 2 is a cross section through the switching element of FIG. 1 along line FIG. 2-FIG. 2.
Figures 3A, 3B:
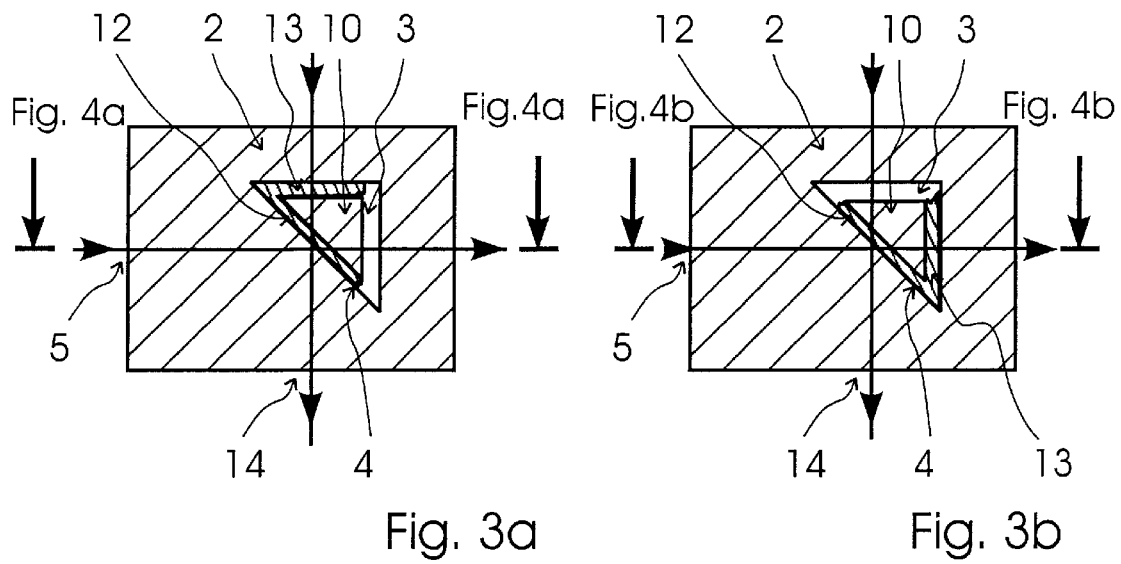
Figures 4A, 4B:
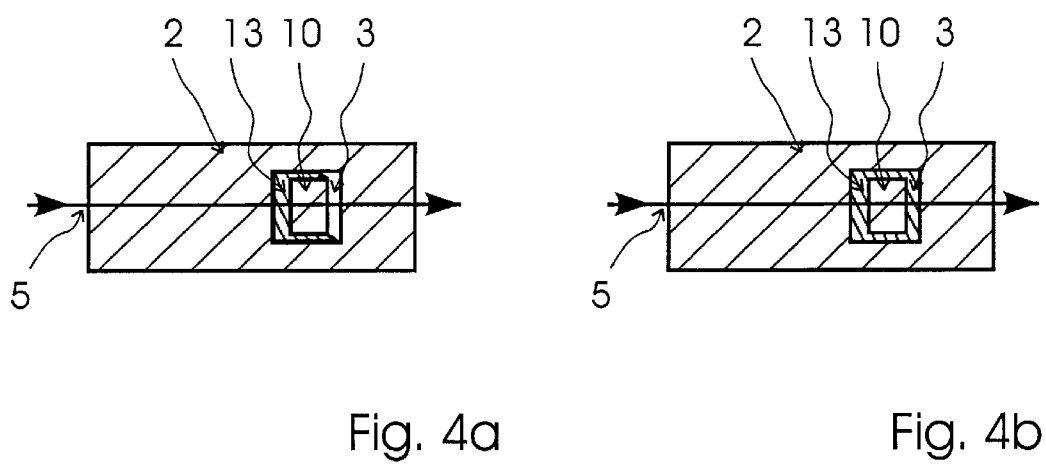

In the switch condition shown in FIGS. 1 and 2, the boundary surface 4 on which the incident light 5 impinges is not wetted with the fluid 13, so that the incident light is totally reflected at the boundary surface. The incident light 5 and the light 14 emerging from the base body 2 subtends an angle of 90°.

In order to switch the switching element 1 into the transmitting condition, the triangular body 10 is shifted by means of the activating device in the recess 3 so that the narrow slit 12 between the boundary surface 4 and the body 10 is positioned such that the region of the boundary surface on which the incident light 5 impinges is completely covered by the fluid 13. In this process, the movable body 10 can assume the positions represented in FIGS. 3a and 4a and 3b and 4b. The only critical factor is that the region of the boundary surface 4 lying in the path of the incident light 5 be completely covered with the fluid. Since the base body 1, the fluid 13, and the triangular body 10 have roughly the same index of refraction, the incident light 5 again emerges from the base body 2 without altering its direction. Light impinging at a right angle to the lateral surfaces 6, 7 is also not reflected in this switch condition, but instead can pass unhindered through the switch element (emerging light beam 14).

Figures 5A, 5B:
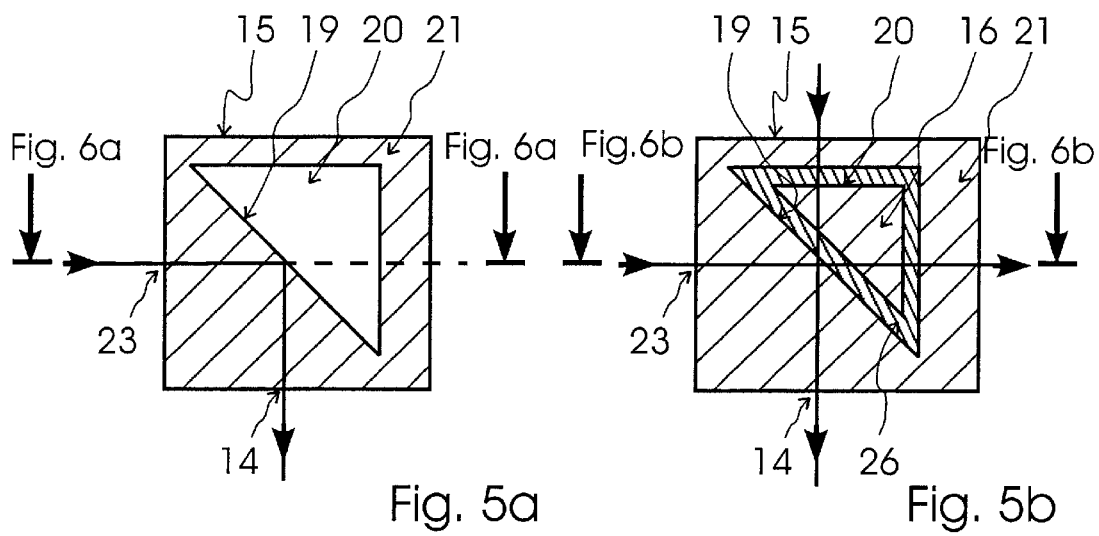
FIG. 5a is an embodiment which can be based both on the principle of the fluid film and on the principle of displacement, wherein the switching element assumes the switch condition of reflection.
FIG. 5b is the switching element of FIG. 5a in the transmitting condition.

FIGS. 5a and 5b show an embodiment of the switching element 15 that can function both according to the fluid film principle and the displacement principle. The switching element 15 differs from the switching element 1 described with reference to FIGS. 1 through 4 in that the triangular body 16 is movably guided in the vertical direction in the recess 20 of the base body 21.

Figures 6A, 6B:
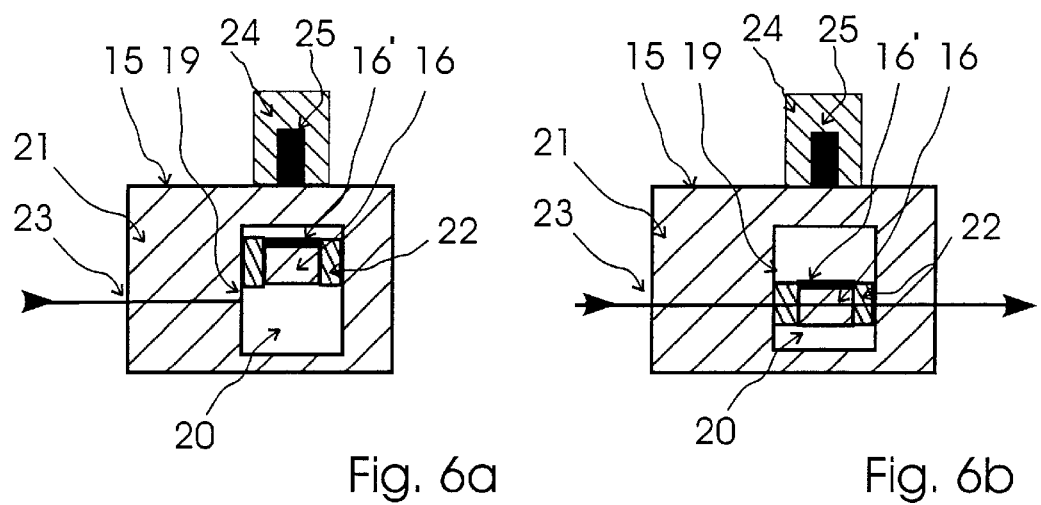

FIGS. 6a and 6b show the embodiment of a switching element 15 based on the fluid film principle according to FIGS. 5a and 5b, in cross section schematic representation. Due to forces of adhesion, as the triangular body 16 moves the fluid 22 remains between the surfaces. In the switch condition represented in FIG. 6a, the boundary surface 19 is not covered with the fluid film 22, so that the incident light 23 is totally reflected. If the triangular body 16 is at the height of the beam path, the incident light 23 is not deflected (FIG. 6b). The fluid film, furthermore, acts as a lubricating film and reduces wear and tear on the reflecting surfaces.

Activation of the triangular body 16 is done by means of an electromagnetic activating device 24, which is arranged outside the recess above the movable body 16. The activating device 24 has an electromagnet 25, e.g., with a lithographically produced coil, and the movable body 16 is provided with a magnetic or magnetizable material 16' at its top and bottom side.

Figures 7, 8:
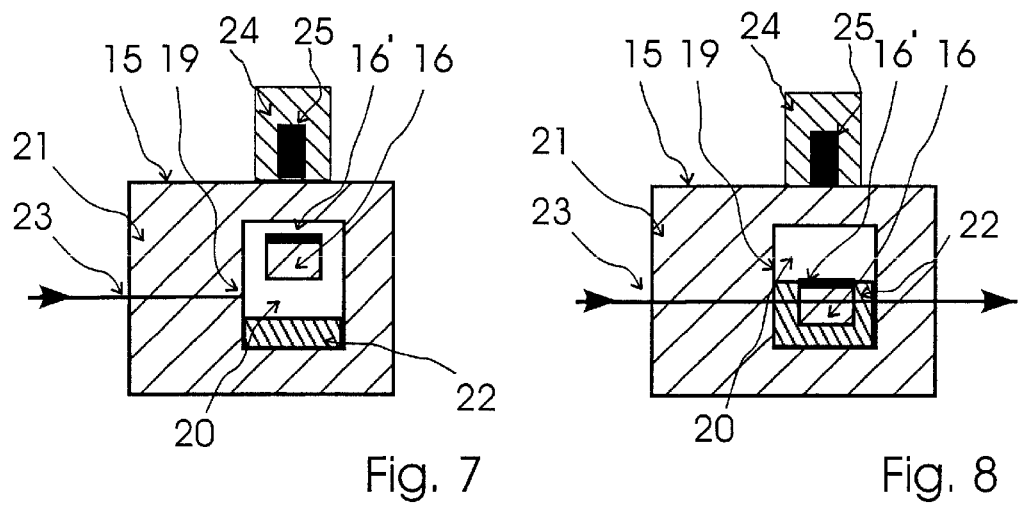

FIGS. 7 and 8 show the embodiment of a switching element based on the displacement principle according to FIG. 5a and 5b in cross section schematic representation, wherein the elements which correspond to the elements of the sample embodiment according to FIGS. 5a through 6b are provided with the same reference numbers. The movable body 16 is moved in the vertical direction by means of the electromagnetic activating device 24. In the switching condition of total reflection as represented in FIG. 7, the fluid level lies outside the region of the boundary surface 19 on which the incident light 23 impinges. In the switch condition of transmission, the fluid is displaced by a triangular body 16 so that the lower region of the recess is completely filled up with a medium that has roughly the same index of refraction as the base body (FIG. 8).

Figure 9A:
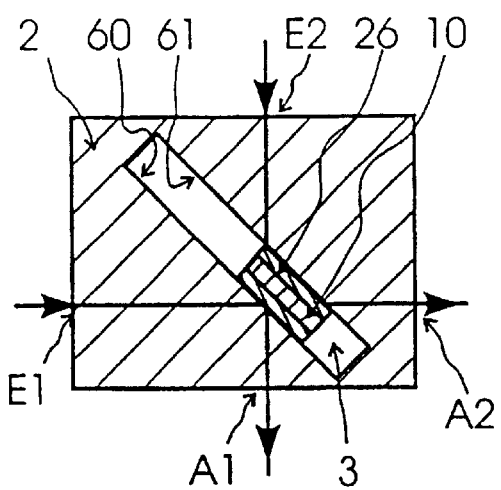
FIG. 9a is an embodiment of the switching element based on the fluid film principle, wherein the switching element is in the transmitting condition and the recess and the movable body have a rectangular cross section.
Figure 9B:
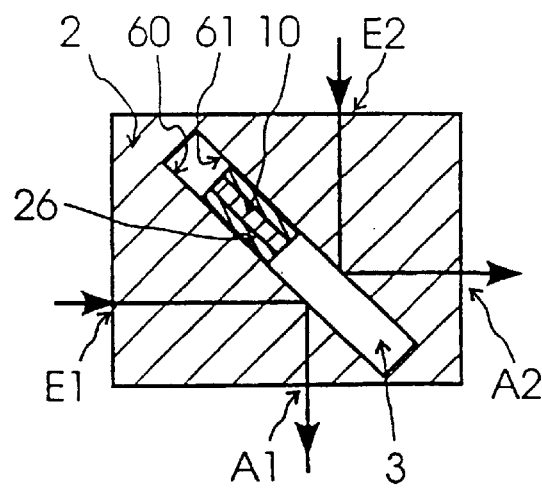
FIG. 9b is the switching element per FIG. 9a in the reflecting condition.

FIGS. 9a and 9b show an embodiment based on the fluid film principle, wherein the recess 3 and the movable body 10 have a rectangular cross section in the plane of the path of a light beam. Between the parallel surfaces 60, 61 of the recess 3 and the movable body 10 there is a fluid film 26. FIG. 9a shows the switching element in the transmitting condition. In FIG. 9b, the movable body 10 is located outside the beam path, so that the two surfaces 60, 61 are not wetted with the fluid. Using this switch element, the input E1 can be arbitrarily connected to the output A1 or A2, while at the same time the input E2 is connected to the output A2 or A1, respectively.

Figure 10A:
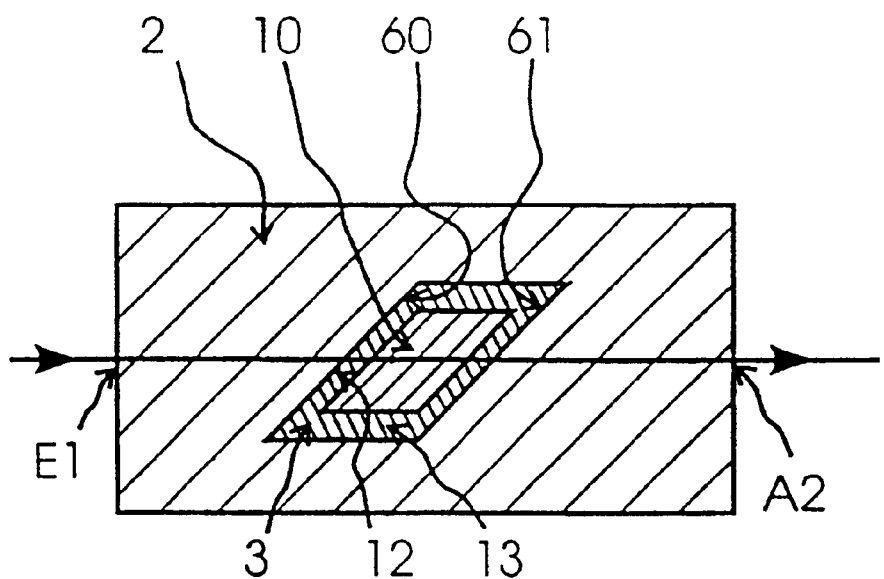
FIG. 10a is a sample embodiment of the switching element with a parallelogram type cross section of the recess and of the movable body, wherein the switching element is in the transmitting condition.
Figure 10B:
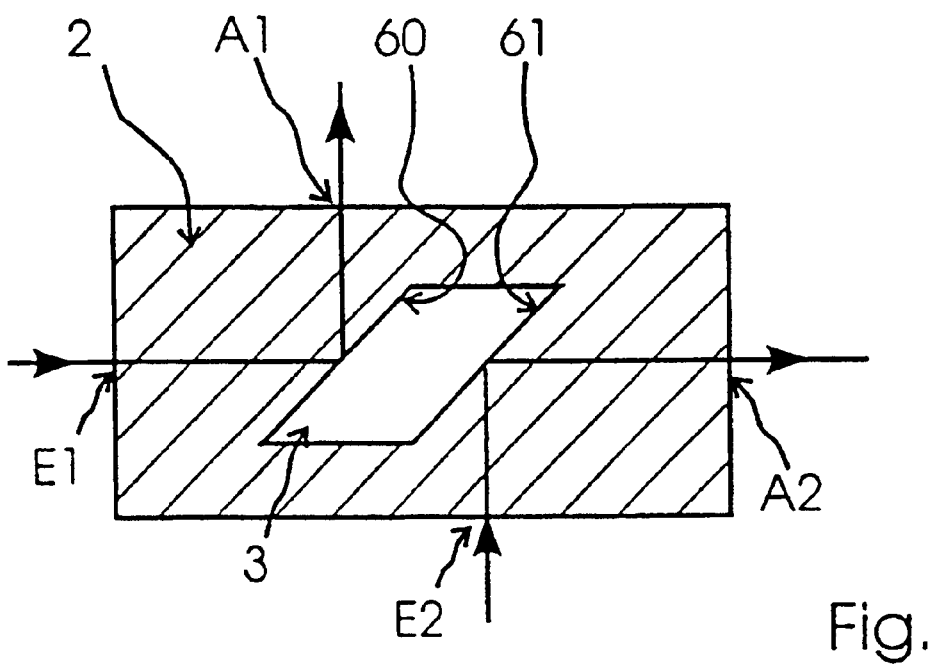
FIG. 10b is the switching element per FIG. 10a in the reflecting condition.

FIGS. 10a and 10b show a further embodiment of the switching element with a cross section of the recess 3 and the movable body 10 that has the shape of a parallelogram in the plane of the path of a light beam. This switching element can be operated by the fluid film principle and by the displacement principle or a combination of both principles. The two parallel lateral surfaces 60, 61 of the recess 3 are so far apart that, in contrast with FIGS. 9a and 9b, the input E2 and the output A1 are not joined together in the transmitting condition. In the transmitting condition, the input E1 is connected to the output A2 in FIG. 10a. FIG. 10b shows the reflecting condition of the switch, in which the inputs E1 and E2 are connected with the outputs A1 and A2, respectively.

Figure 11A:
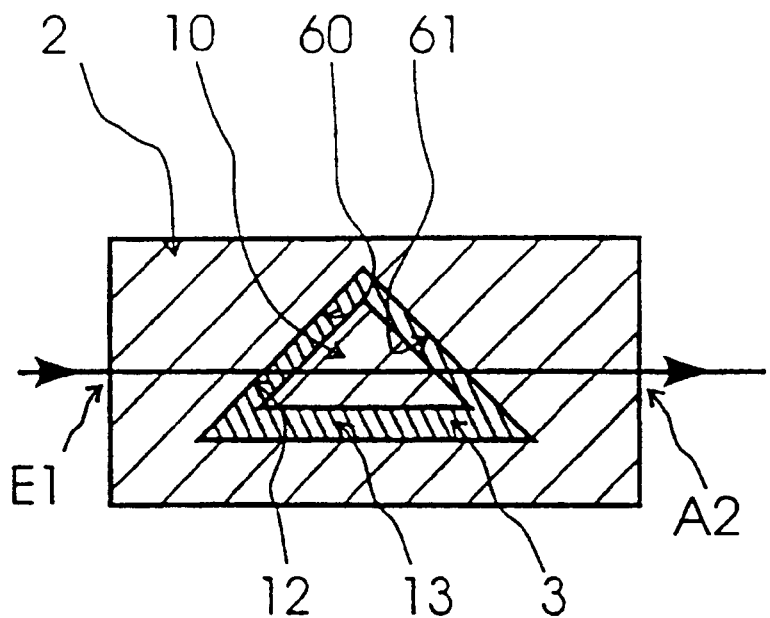
FIG. 11a is another sample embodiment of the switching element with a triangular cross section of the recess and of the movable body, wherein the switching element is in the transmitting condition.
Figure 11B:
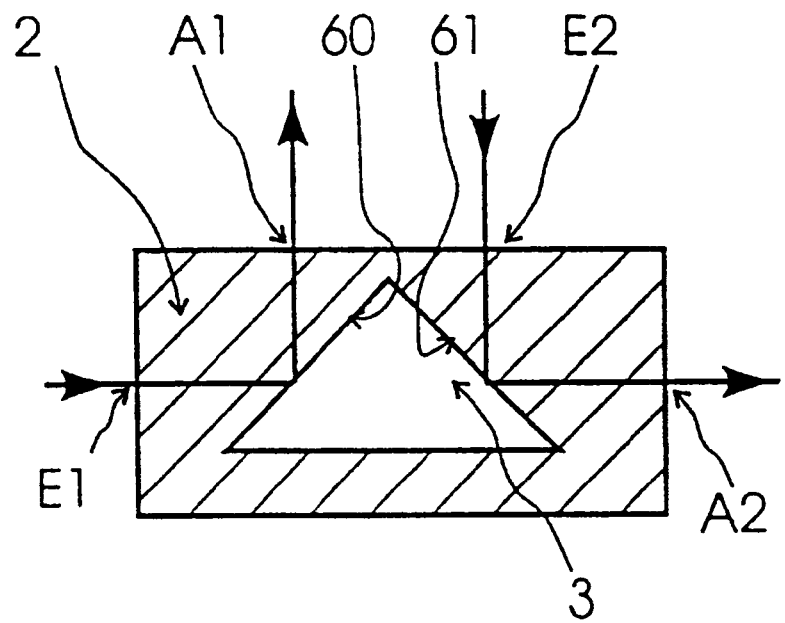
FIG. 11b is the switching element per FIG. 11a in the reflecting condition.

Another sample embodiment is represented in FIGS. 11a and 11b. The recess 3 and the movable body 10 possess here the shape of an equilateral triangle. The angle between the two side surfaces 60, 61 amounts to roughly 45° here. In FIG. 11a, the transmitting condition of the switch is represented, during which the input E1 is connected to the output A2. In the reflecting condition of the switch (FIG. 11b), the incident light beams are essentially reflected totally at the side surfaces 60, 61 forming the boundary surfaces, so that the inputs E1 and E2 are connected with the outputs A1 and A2, respectively.

Figure 12:
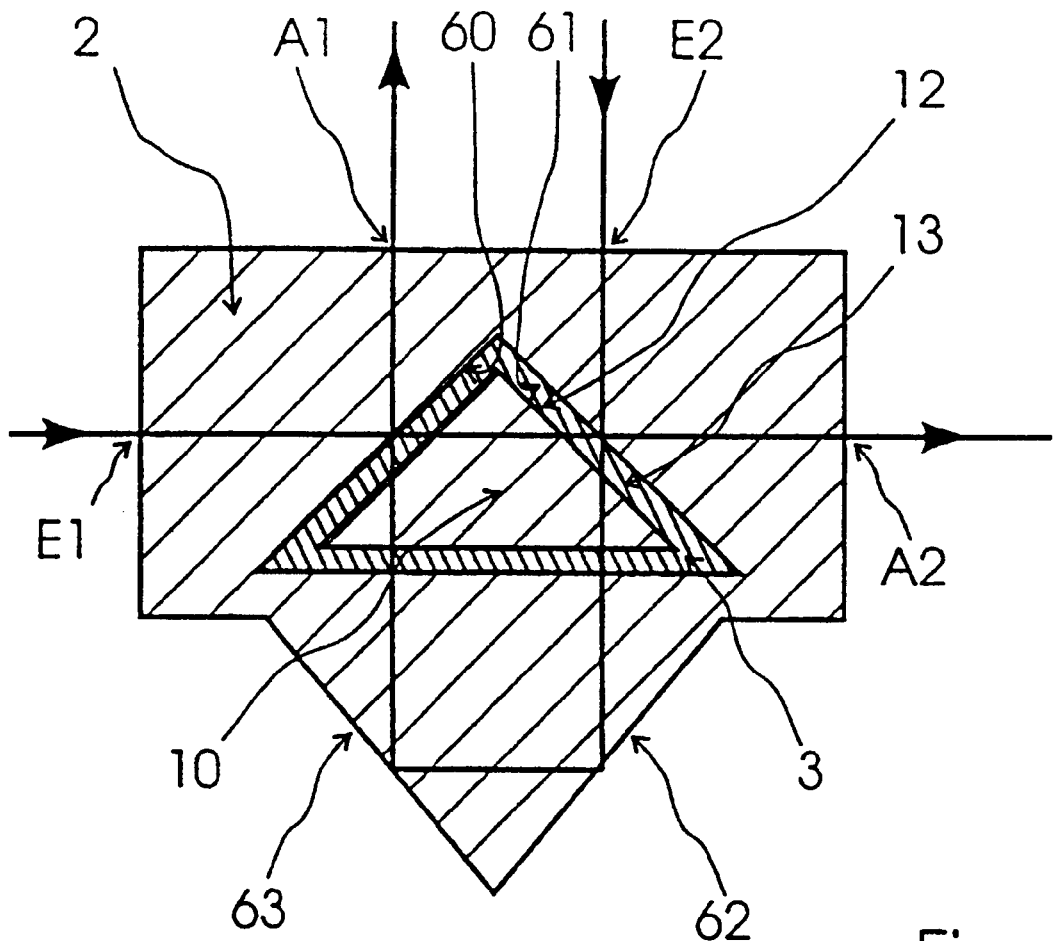
FIG. 12 is a switching element per FIG. 11a with two additional reflecting surfaces on the base body.

Another embodiment of the switching element is represented in FIG. 12 in the transmitting condition of the switch. In the reflecting condition, this switching element has the same method of operation as the switching element represented in FIG. 11b. Thanks to the two additional surfaces 62, 63 on the base body 2, which make an angle of around 90° here, a light beam from the input E2 is reflected through the recess 3 in the direction of the output A1 in the transmitting condition of the switch. Preferably, an optically less dense medium is located outside the switching body 2, so that the reflection at the surfaces 62, 63 is a total reflection. In order to protect these surfaces 62, 63 against external influences, they can also be accommodated in the form of an additional recess in the base body 2.

Figure 13:
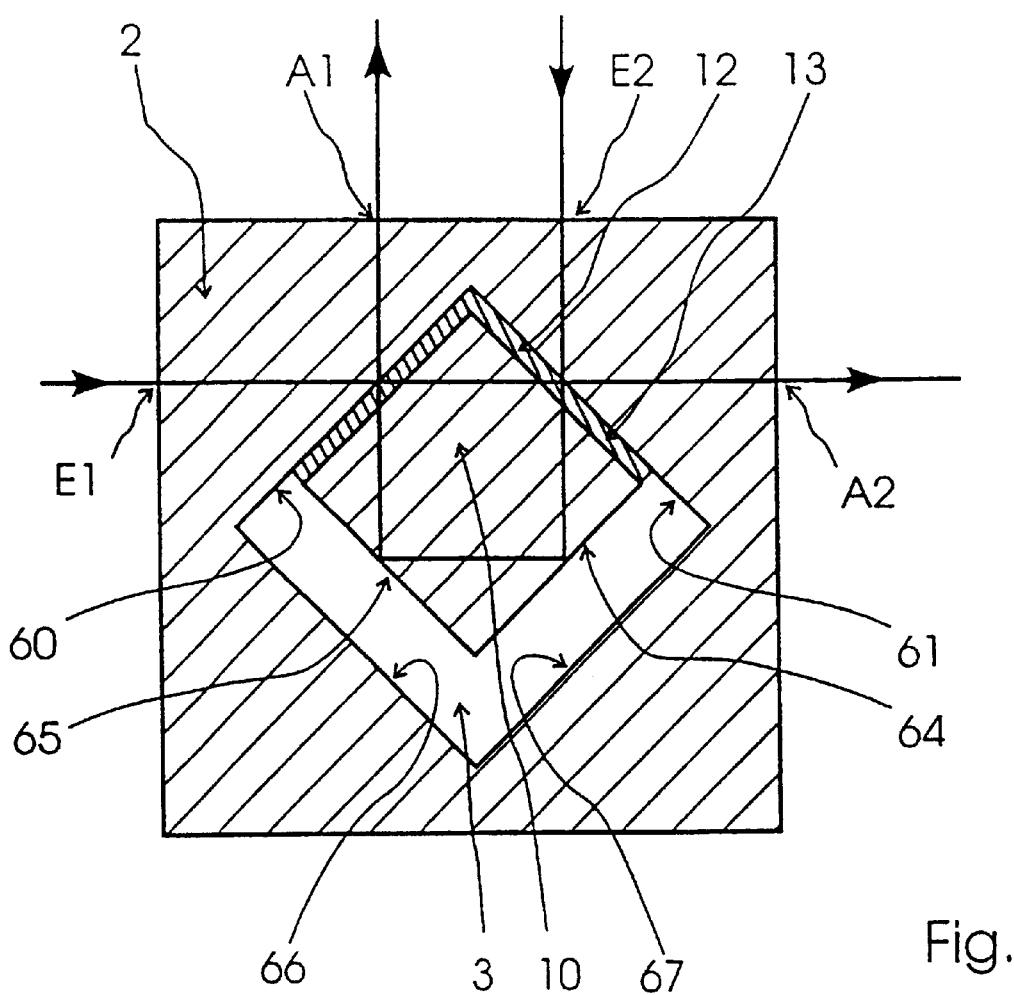
FIG. 13 is a switching element according to the principle shown in FIG. 12, wherein the movable body has two additional reflecting surfaces.

The principle of deflection of a transmitting light beam as represented in FIG. 12 is also based on the representation of a transmitting switch element in FIG. 13. The gap between the two side surfaces 60, 61 of the recess 3 and the movable body 10 is filled here with a fluid film 13. On the other hand, the two opposite-lying surfaces 64, 65 of the movable body 10 are not wetted by the fluid 13, due to the larger distance from the side surfaces 66, 67 of the recess. The two surfaces 64, 65 subtend an angle of around 90° to each other, so that a light beam arriving from the input E2 and passing through the surface 61 of the recess 3 is totally reflected at these two surfaces 64, 65 in the direction of the output A1.

Figure 14A:
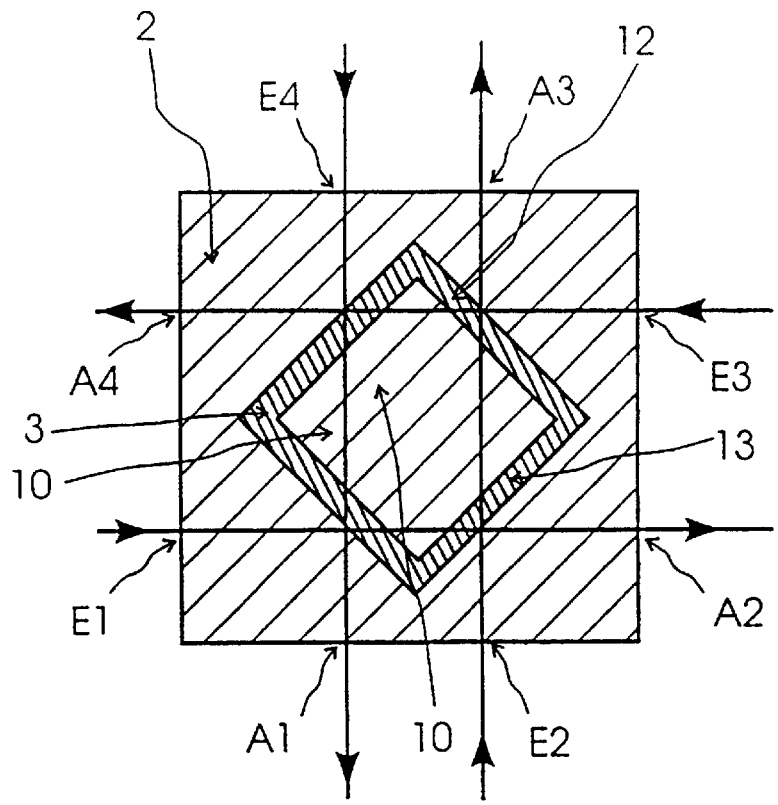
FIG. 14a is a sample embodiment of the switching element as an optical multiple switch in the transmitting condition with square cross section of the recess and the movable body.
Figure 14B:
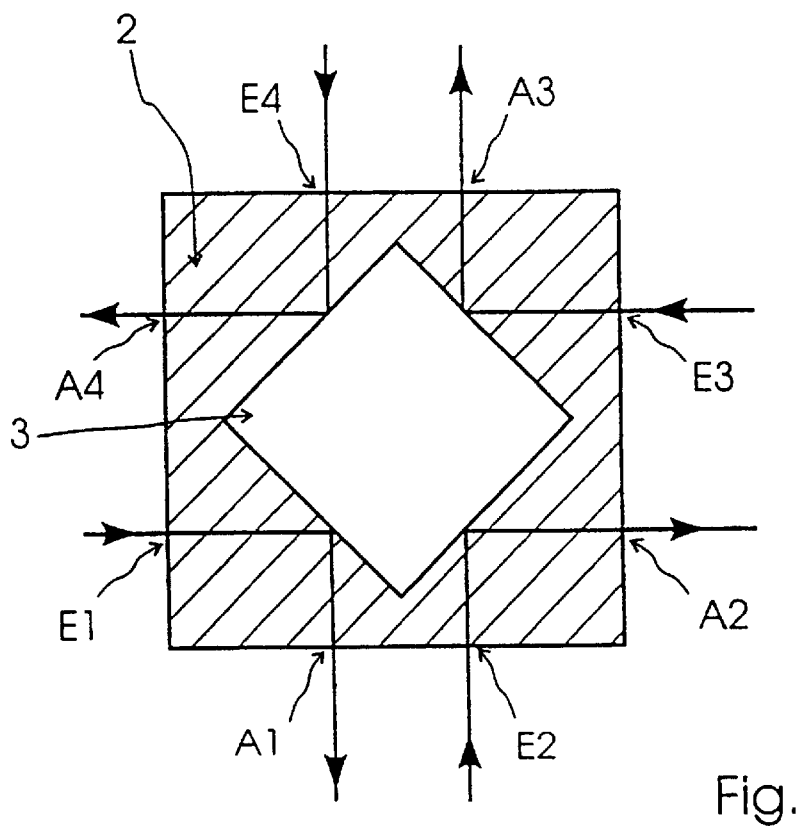
FIG. 14b is the optical multiple switch of FIG. 14a in the reflecting condition.

FIG. 14a shows a switching element in the transmitting condition, serving as an optical multiple switch. All four surfaces of the recess 3, which is square shaped in cross section, serve as boundary surfaces for the arbitrary transmission or reflection of light. In the example represented here, the inputs E1, E2, E3 and E4 are connected to the outputs A2, A3, A4 and A1, respectively. In the reflecting condition represented in FIG. 14b, the inputs E1, E2, E3 and E4 are connected to the outputs A1, A2, A3 and A4, respectively.

Figure 15:
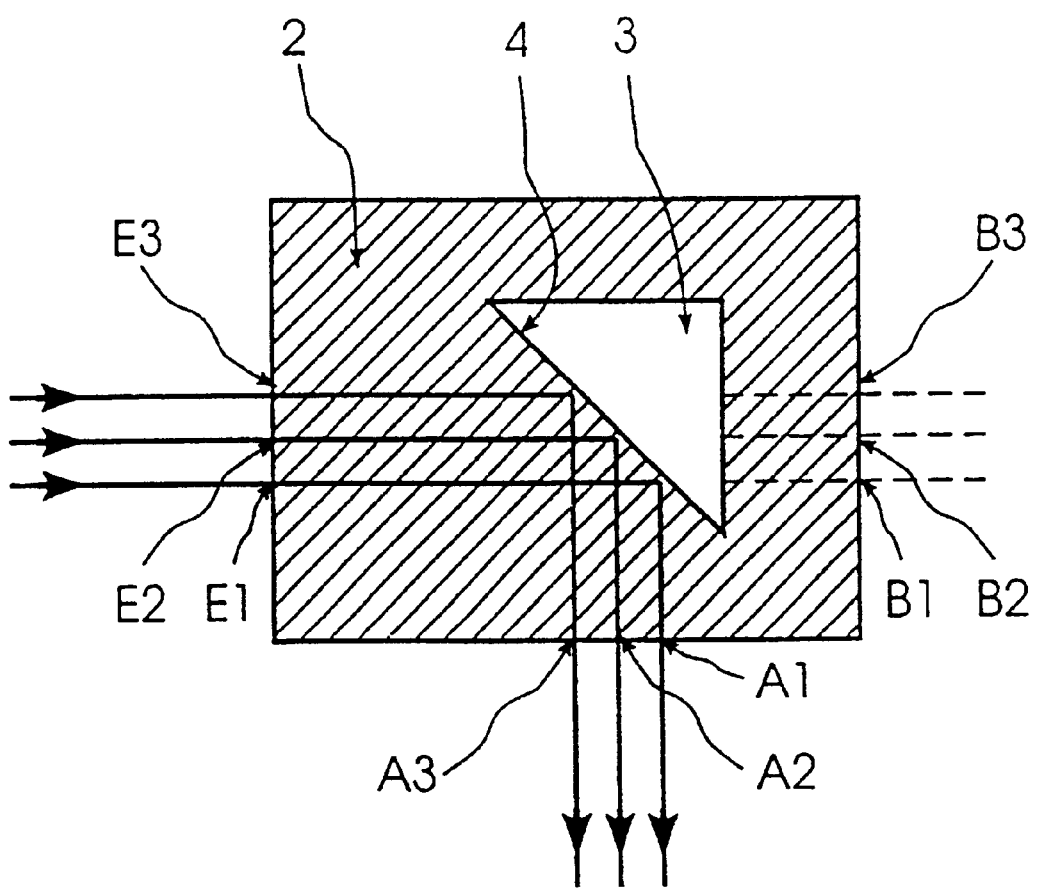
FIG. 15 is a sample embodiment of the switching element as an optical multiple switch, wherein the incident and the reflected light beams lie in the same plane.

FIG. 15 shows a switching element with several optical inputs and outputs in the reflecting condition. At one boundary surface 4 of the triangular recess 3 there are three light beams impinging from the inputs E1, E2 and E3 and these are totally reflected in the direction of the outputs A1, A2 and A3. In the transmitting condition of the switch (not represented here), the incident light beams impinge on the outputs B1, B2 and B3 as indicated here. The incident and the reflected light beams lie essentially in the same plane here.

In another embodiment of an optical multiple switch, the plane of the incident light beams forms with the plane of their reflected light beams an angle of preferably 70 to 110°. This is shown in FIGS. 16a and 16b by means of a cross section through an optical switching element, for example, according to FIG. 11a, 11b, or FIG. 12, with two inputs lying in the plane of the cross section.

Figure 16A:
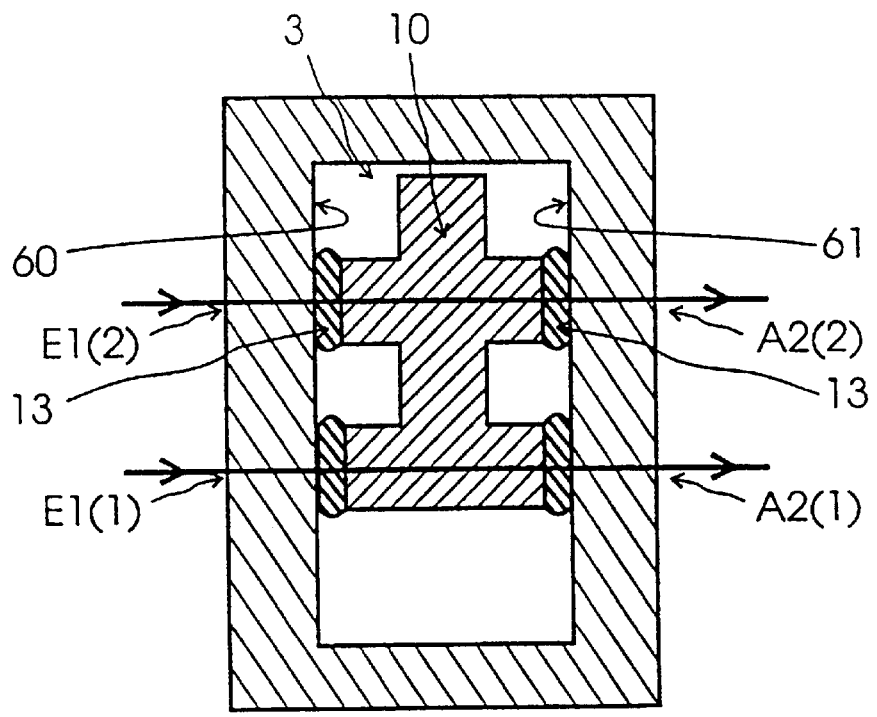
FIG. 16a is another sample embodiment of the switching element in the transmitting condition as a multiple switch with a movable body with regions differing in cross section, represented in the plane of the transmitted light beams.
Figure 16B:
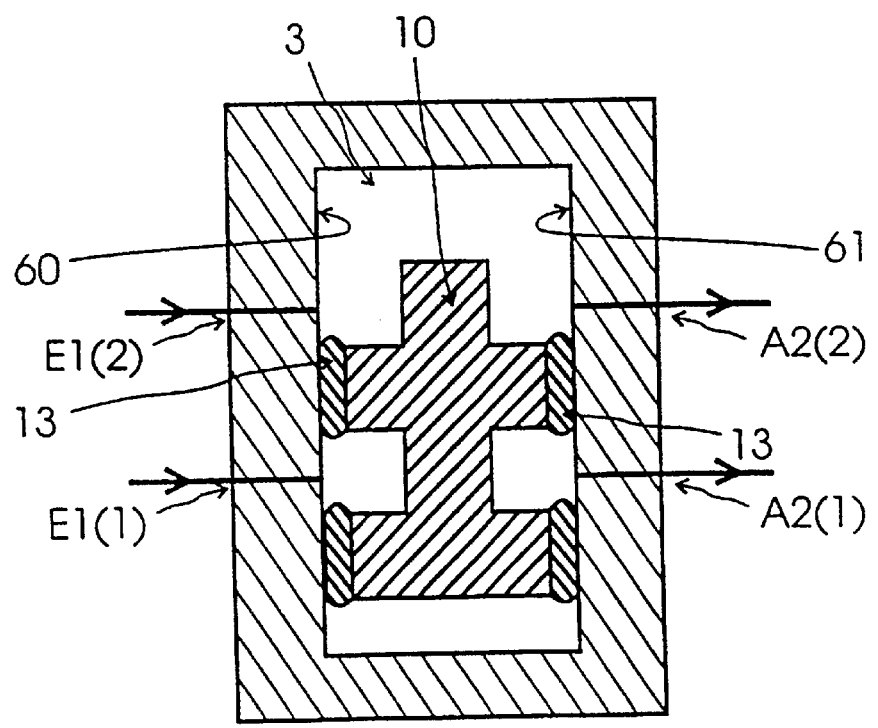
FIG. 16b is the switching element per FIG. 16a in the reflecting condition, wherein the plane of the incident light beams forms, with the plane of its reflected light beams (not shown here), an angle of around 90°.

FIG. 16a shows the transmitting condition of the switch. The inputs E1(1) and E1(2) are switched to the outputs A2(1) and A2(2), respectively. Instead of having a fluid film between the recess 3 and the movable body 10 extending across each of the side surfaces 60 and 61, the movable body 10 is formed such as to have regions of larger cross section and intervening regions of smaller cross section. The regions of larger cross section border so close on the recess 3 that a fluid film 13 is formed there between the movable body 10 and the boundary surface 60, 61 of the recess 3. No fluid film exists between the regions of smaller cross section of the movable body and the boundary surface 60, 61 of the recess 3. In order to go from the transmitting to the reflecting condition of the switch, the movable body 10 only needs to be shifted enough that a region of smaller cross section of the movable body comes to lie in the beam path, so that the boundary surfaces 60, 61 are not wetted with the fluid 13 in the region of the beam path (FIG. 16b). The light beams shown here leaving the outputs A2(1) and A2(2) represent the light beams coming from the inputs E2(1) and E2(2) and reflected at the boundary surface 61.

Figure 17:
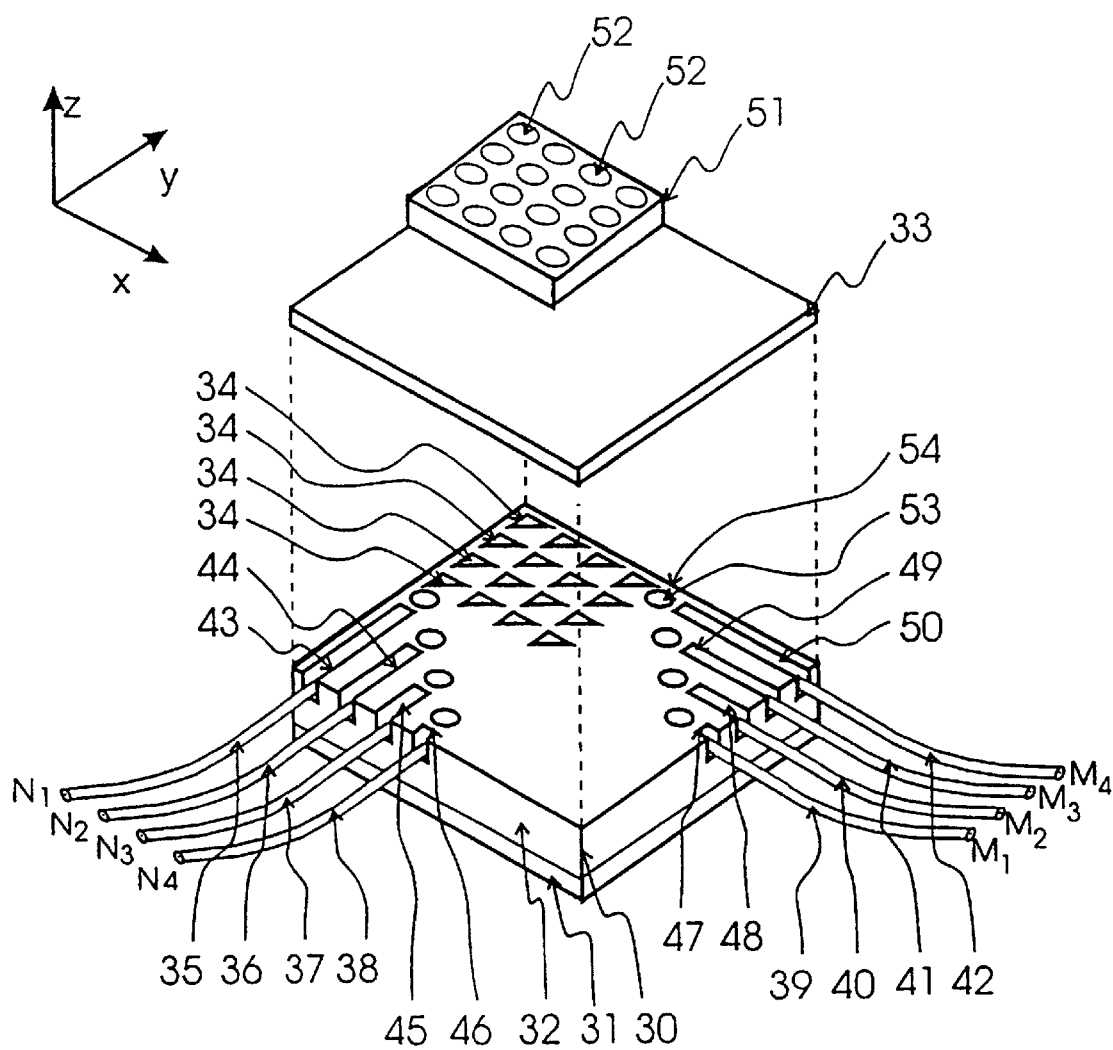
FIG. 17 is a switch arrangement with four input and four output channels with switching elements arranged in the manner of a 4×4 matrix in schematic perspective view.

FIG. 17 shows a 4×4 matrix switch, with which each of the four optical inputs $N_1$ to $N_4$ can be connected to each of the four optical outputs $M_1$ to $M_4$. The matrix switch has a flat base body 30, which consists of a bottom plate 31, a structurized middle plate 32, and a top plate 33. The structurized plate 32 accommodates switching elements 1, of the above-described type, arranged in the manner of a 4×4 matrix. The recesses of the switching elements 1, 15, which are covered by the upper plate 33, are given the reference number 34 in FIG. 17. The input and output fibers 35 to 38 and 39 to 42, respectively, are arranged as a cascade in the channels 43 to 46 and 47 to 50, respectively, of the structurized plate 32, in order to ensure a uniform optical path length regardless of the particular condition of the switch. The input channels 43 to 46 make approximately a right angle with the output channels 47 to 50, while the boundary surfaces of the recesses 34 of the switching elements 1, 15 are arranged at an angle of roughly 45° to the input and output channels. Spherical lenses 53 are provided for collimation or focusing of the light. The spherical lenses 53 are placed in depressions 54 of the structurized plate 32 of the base body 30, which are arranged between the light exit ends of the input fibers 35–38 and output fibers 39–42 and the switching elements 1, 15. On the top plate 33 of the base body 30 is attached another plate 51, in which the electromagnets 52 of the activating device coordinated with the individual switching elements are integrated. By switching the individual switching elements from the transmitting to the reflecting condition or vice versa, each input channel $N_1$ through $N_4$ can be switched arbitrarily to each output channel $M_1$ to $M_4$.

Figure 18:
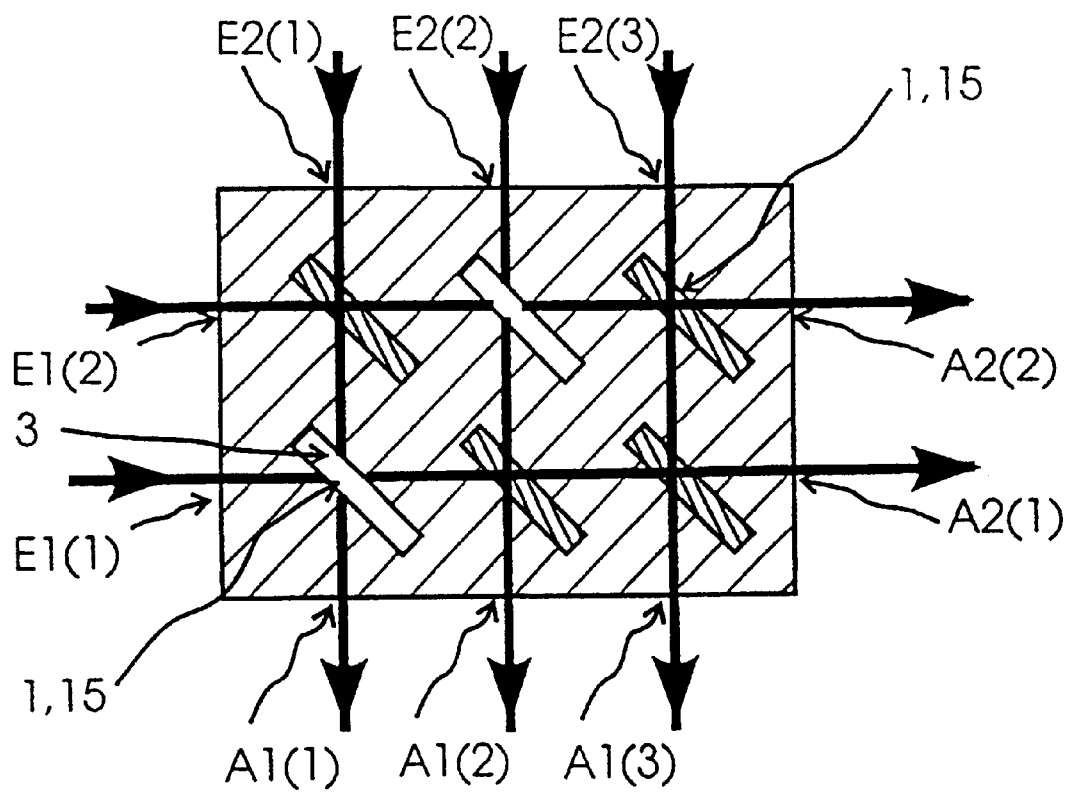
FIG. 18 is a switch arrangement with 2×3 input and 2×3 output channels with switching elements arranged in the manner of a 2×3 matrix in schematic representation.

FIG. 18 shows another embodiment of a switch arrangement with five optical inputs E1(1), E1(2) and E2(1), E2(2), E2(3) and five optical outputs A1(1), A1(2) and A2(1), A2(2), A2(3) and 2×3 switching elements according to the invention, each with two parallel side surfaces in matrix arrangement. In this schematic representation, for sake of clarity, the input and output optical waveguides and optical elements for beam focusing have been omitted. The switching elements in matrix positions (1, 1) and (2, 2) are switched to reflection in this example, while the other switching elements, shown by broken line in FIG. 18, are switched to transmission. In this way, the inputs E1(1), E1(2), E2(1), E2(2), E2(3) are optically connected to the outputs A1(1), A1(2), A2(1), A2(2) and A1(3), respectively.

Figure 19:
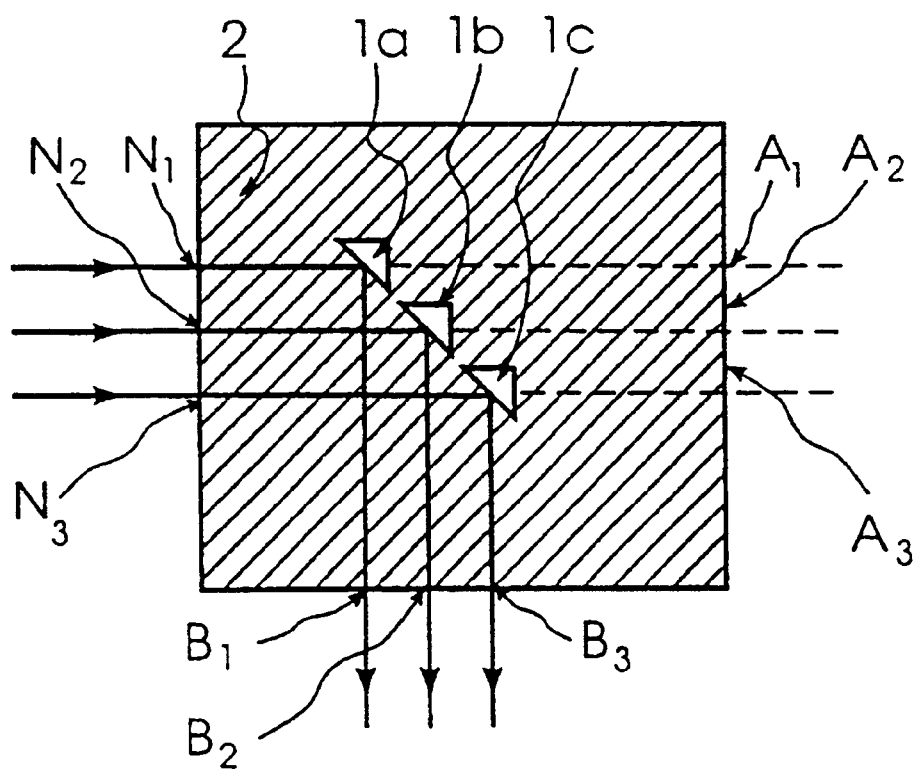
FIG. 19 is a switch arrangement with three input and 2×3 output channels with three switching elements arranged in the manner of a diagonal of a 3×3 matrix in schematic representation.

FIG. 19 shows an embodiment of a switch arrangement with three diagonally arranged switching elements 1a, 1b, 1c in schematic representation, in which three optical inputs N. to $N_3$ can be arbitrarily switched to three optical outputs $A_1$ to $A_3$ or to three optical outputs $B_1$ to $B_3$. The switching element 1a is assigned to the input $N_1$ and the output $A_1$ or $B_1$, the switching element 1b is assigned to the input $N_2$ and the output $A_2$ or $B_2$, and the switching element 1c is assigned to the input $N_3$ and the output $A_3$ or $B_3$. If the switching elements 1a, 1b, 1c are switched to the transmitting condition, the inputs $N_1$, $N_2$, $N_3$ are connected to the outputs $A_1$ or $A_2$ or $A_3$, respectively. In the reflecting condition of the switch, the light is deflected, so that the inputs $N_1$, $N_2$, $N_3$ are connected to the outputs $B_1$ or $B_2$ or $B_3$, respectively. If it is desired only to switch simultaneously the three switching elements to the transmitting or reflecting condition of the switch, instead of three individual switching elements one can also provide only one switching element of correspondingly larger dimension, on the boundary surface of which the light of the three optical channels impinges (FIG. 15).

Figure 20:
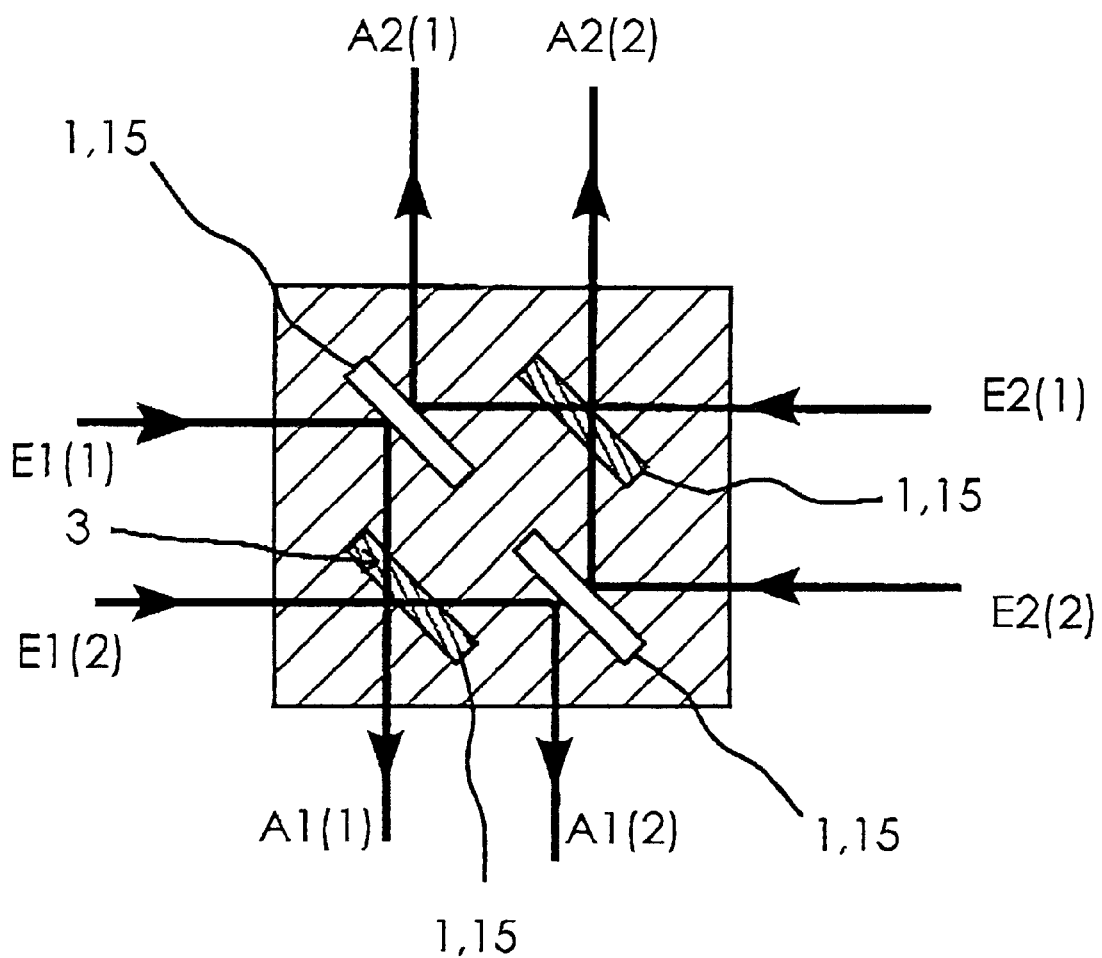
FIG. 20 is an embodiment corresponding to the switch arrangement shown in FIG. 18, in which the inputs and outputs are arranged opposite.

FIG. 20 shows an embodiment of a switch arrangement which differs from the embodiment represented in FIG. 18 in that the inputs E1(1) and E2(2) are opposite the inputs E2(1) and E2(2). Accordingly, the outputs are also arranged oppositely. Such an arrangement is possible whenever at least one switching element 1, 15 of the switching elements lying between the opposite inputs is switched to reflection. Depending on the width of the switching elements 1, 15, the opposite inputs and outputs are arranged with a slight offset from each other.

The switching elements must have two surfaces for reflection of the light. Since the left input channels are always switched only to the lower output channels and the right input channels only to the upper output channels, no offset of the light beams due to the width of the switching cell occurs, as may be the case, for example, in the embodiment per FIG. 18. This expansion is useful for switching matrices with at least one row (two opposite inputs) and at least two columns (twice two opposite outputs).

What is claimed is:

1. An optical switching element for changing the direction of propagation of at least one light beam comprising: a transparent base body at least along the beam path, which has a boundary surface, on which the incident light beam impinges, between an optically more dense medium and an optically less dense medium and a recess to form at least one boundary surface, which contains a fluid and a body movable in the recess, wherein the base body and the movable body consist at least partially of materials that are transparent in the wavelength region used, and the fluid being of such nature and the movable body being of such configuration and able to move in the recess between a position in which the optical switching element is in a transmitting condition and a position in which the optical switching element is in a reflecting condition, that, in the transmitting condition of the switch, the movable body is situated in the wave path of the incident light and at least the region of a slit between the boundary surface and the surface of the movable body lying in the path of the incident light is filled completely with the fluid, wherein in the reflecting condition of the switch, at least the region of the boundary surface lying in the path of the incident light is free of the fluid, so that the incident light is essentially reflected at the boundary surface and at least one activating device is provided for switching the moveable body between the transmitting and the reflecting condition of the switch.

2. An optical switching element according to claim 1, wherein the base body, the movable body and the fluid have basically the same index of refraction.

3. An optical switching element according to claim 1, wherein the movable body is provided with at least one body or a layer of magnetic or magnetizable material and the activating device preferably has at least one electromagnet and/or permanent magnet arranged outside the recess.

4. An optical switching element according to claim 1, wherein the movable body is connected to at least one preferably piezoelectric or thermoelectric activating device.

5. An optical switching element according to claim 1, wherein the recess is filled with the fluid so much that, in the reflecting condition of the switch, the region of the boundary surface lying in the beam path of the incident light lies outside the fluid level, and in the transmitting condition of the switch the movable body is moved into the fluid such that the region of the slit lying in the beam path of the incident light is filled with fluid by displacement.

6. An optical switching element according to claim 1, wherein a fluid film is formed between a portion of the surface of the movable body and a portion of the wall of the recess and the movable body can move in the recess such that, in the transmitting condition of the switch, the region of the slit between the boundary surface and the surface of the movable body lying in the beam path of the incident light is filled with the fluid film, and in the reflecting condition of the switch the region of the boundary surface lying in the beam path of the incident light is free of the fluid film.

7. An optical switching element according to claim 1, wherein the recess and the movable body have an essentially triangular cross section in the plane of the beam path of a light beam.

8. An optical switching element according to claim 1, wherein the recess and the movable body have essentially a rectangular cross section in the plane of the path of a light beam.

9. An optical switching element according to claim 1, wherein the boundary surface is arranged such to the incident light beam that in the reflecting condition of the switch the incident light is essentially totally reflected at the boundary surface.

10. An optical switching element according to claim 9, wherein the angle between the incident light beam and the boundary surface is 40 to 50°.

11. An optical switching element according to claim 1, wherein the boundary surface is configured such that, in the reflecting condition, light is at least partly collimated by reflection at the boundary surface.

12. An optical switching element according to claim 1, wherein the base body has at least one additional recess to accommodate and hold optical waveguides, in particular, individual fibers, fiber bands, or fiber connectors.

13. An optical switching element according to claim 1, wherein the base body has at least one additional recess for accommodation of optical elements, in particular, micro lenses or GRIN lenses.

14. An optical switching element according to claim 1, wherein the base body has at least one additional recess which is configured and arranged in the wave path such that it essentially collimates incident light.

15. An optical switching element according to claim 1, wherein one surface of the recess is provided for optional reflection or transmission of light beams.

16. An optical switching element according to claim 1, wherein two surfaces of the recess are provided for optional reflection or transmission of light beams.

17. An optical switching element according to claim 16, wherein the two reflecting surfaces are arranged essentially parallel to each other.

18. An optical switching element according to claim 16, wherein the two reflecting surfaces are arranged at an angle of 70 to 110° to each other.

19. An optical switching element according to claim 18, wherein the recess and the movable body have essentially the cross section of an equilateral triangle in the plane of the wave path of a light beam.

20. An optical switching element according to claim 18, wherein the base body has two additional surfaces which are arranged essentially opposite the two reflecting surfaces of the recess and these two surfaces of the base body form an angle of 70 to 110° and are arranged so that, in the transmitting condition of the switch, at least one light beam is totally reflected on both surfaces.

21. An optical switching element according to claim 20, wherein the two additional surfaces are formed by at least one additional recess in the base body.

22. An optical switching element according to claim 18, wherein the recess and the movable body have essentially a rectangular cross section in the plane of the wave path of a light beam, and at least the region of the slit between the two reflecting surfaces of the recess and the neighboring surfaces of the movable body lying in the wave path is filled with the fluid in the transmitting condition of the switch, while the third and fourth surface of the movable body opposite these two surfaces of the movable body is not covered with the fluid, so that in the transmitting condition at least one light beam is totally reflected at both surfaces in the movable body.

23. An optical switching element according to claim 1, wherein at least two optical inputs are arranged at an angle of 70 to 110° to each other.

24. An optical switching element according to claim 1, wherein at least three surfaces of the recess are provided for optional reflection or transmission of light beams.

25. An optical switching element according to claim 24, wherein the recess and the movable body have essentially a square cross section in the plane of the wave path of a light beam.

26. An optical switching element according to claim 1, wherein at least a portion of the incident light beams are arranged such to the surface of the recess from which they are reflected in the reflecting condition of the switch that this portion of the incident light beams lies essentially in the same plane as the corresponding reflected light beams.

27. An optical switching element according to claim 1, wherein at least a portion of the incident light beams are arranged such to the surface of the recess from which they are reflected in the reflecting condition of the switch that the plane of this portion of the incident light beams makes an angle of 70 to 110° with the plane of the corresponding reflected light beams.

28. An optical switching element according to claim 1, wherein the movable body has at least two regions with larger cross section parallel to the plane of the wave path of a light beam, bordering so close on at least one surface of the recess that a fluid film remains in existence between these regions and the corresponding surface of the recess, while between the other regions with smaller cross section of the movable body and the corresponding surface of the recess no fluid film exists.

29. An optical switching element according to claim 1, wherein the base body and/or the movable body consists at least partially of a transparent polymer, a glass, or a transparent material produced by a sol-gel process.

30. A switch arrangement comprising: N optical inputs and M optical outputs, with N, M>1, having switching elements arranged in the form of a N×M switching matrix with N lines and M columns, wherein each optical switching element serves to alter the direction of propagation of at least one light beam, at least one light beam with a transparent base body at least along the beam path, which has a boundary surface, on which the incident light beam impinges, between an optically more dense medium and an optically less dense medium and a recess to form at least one boundary surface, which contains a fluid and a movable body, wherein the base body and the movable body consist at least partially of materials that are transparent in the wavelength region used, and the fluid being of such nature and the movable body being of such configuration and able to move in the recess between a position in which the optical switching element is in a transmitting condition and a position in which the optical switching element is in a reflecting condition, that, in the transmitting condition of the switch, the movable body is situated in the wave path of the incident light and at least the region of a slit between the boundary surface and the surface of the movable body lying in the path of the incident light is filled completely with the fluid, and in the reflecting condition of the switch, at least the region of the boundary surface lying in the path of the incident light is free of the fluid, so that the incident light is essentially reflected at the boundary surface and with at least one activating device is provided for switching the switching element between the transmitting and reflecting condition by moving the movable body.

31. A switch arrangement according to claim 30, wherein the recesses of the switching elements are arranged in the manner of a N×M matrix in a common base body.

32. A switch arrangement according to claim 30, wherein the switching elements are realized as individual switch modules and are arranged in recesses of a matrix plate that are arranged according to a N×M matrix.

33. A switch arrangement according to claim 30, wherein the base body and/or the matrix plate has N parallel channels to accommodate N input optical wave guides and M parallel channels to accommodate M output optical wave guides, the input channels being arranged at an angle of 70 to 110° to the output channels and the boundary surfaces of the recesses of the switching elements being arranged at an angle of 40 to 50° to the input and/or output channels.

34. A switch arrangement according to claim 30, wherein the switch arrangement has in addition N second optical outputs, which are arranged on the side of the switch arrangement opposite the first N optical inputs.

35. A switch arrangement according to claim 30, wherein the switch arrangement has M second optical inputs, which are arranged on the side of the switch arrangement opposite the first M optical outputs.

36. A switch arrangement according to claim 30, wherein N switching elements are arranged in the manner of a diagonal of a N×N matrix, the number N of the optical inputs being equal to the number M of optical outputs.

37. A switch arrangement according to claim 30, wherein depressions are provided in the wave path between the input and output channels and the recesses of the switching elements, in which optical elements are inserted, especially micro lenses or GRIN lenses.

38. A switch arrangement according to claim 30, wherein the base body is composed of a bottom plate, a structurized plate, and a top plate.

* * * * *